United States Patent [19]
Thiel et al.

[11] Patent Number: 5,363,944
[45] Date of Patent: Nov. 15, 1994

[54] FLOATING-FRAME SPOT-TYPE DISC BRAKE FOR HIGH-TORQUE AUTOMOTIVE VEHICLES

[75] Inventors: Rudolf Thiel, Frankfurt am Main; Ulrich Klimt, Gross-Umstadt; Andreas Doell, Frankfurt am Main, all of Germany

[73] Assignee: Alfred Teves GmbH, Frankfurt am Main, Germany

[21] Appl. No.: 925,708

[22] Filed: Aug. 4, 1992

[30] Foreign Application Priority Data

Aug. 8, 1991 [DE] Germany ............... 4126196

[51] Int. Cl.⁵ .......................... F16D 65/092
[52] U.S. Cl. .................. 188/73.31; 188/72.5; 188/73.39; 188/73.38; 188/250 G; 188/73.1; 188/73.47; 188/73.45
[58] Field of Search ........... 188/73.39, 73.31, 73.45, 188/72.4, 72.5, 73.47, 73.44, 106 P, 73.32, 250, 73.1, 73.2, 73.38, 73.37, 73.36

[56] References Cited

U.S. PATENT DOCUMENTS

| | | | |
|---|---|---|---|
| 4,341,289 | 7/1982 | Smith | 188/73.39 |
| 4,823,920 | 4/1989 | Evans | 188/73.39 X |
| 5,022,500 | 6/1991 | Wang | 188/73.39 X |
| 5,103,939 | 4/1992 | Schroeter | 188/73.47 X |
| 5,181,588 | 1/1993 | Emmons | 188/73.45 X |
| 5,205,383 | 4/1993 | Terrashima | 188/73.45 |

FOREIGN PATENT DOCUMENTS

| | | |
|---|---|---|
| 1072115 | 12/1959 | Germany . |
| 2938784 | 4/1980 | Germany . |
| 3744341 | 8/1980 | Germany . |
| 0412541 | 8/1990 | Germany . |
| 4019792 | 7/1991 | Germany . |
| 3508039 | 1/1986 | Netherlands . |

*Primary Examiner*—Douglas C. Butler
*Attorney, Agent, or Firm*—Robert P. Seitter; J. Gordon Lewis

[57] ABSTRACT

A floating-frame spot-type disc brake is described comprising a floating frame (1) guided in a manner axially displaceable on a brake carrier (12), and being furnished with two brake cylinders (2, 3) and two brake pistons (4, 5) directly acting on two axially inwardly disposed brake shoes (6, 7). The brake carrier (12) is located entirely on one side of the brake disc and no portion extends across the outer edge of the brake disc (15), so that the maximum diameter of the brake disc is limited only by the relatively thin sections of the floating frame (1) extending across the outer edge of the brake disc. Additional brake shoes (8, 9, 22), on the axially outer side, are fixed to the floating frame (1), in turn transmitting the circumferential force acting on the outer shoes occurring during braking through a bolt guide (10), into the brake carrier (12).

11 Claims, 4 Drawing Sheets

FLOATING-FRAME SPOT-TYPE DISC BRAKE FOR HIGH-TORQUE AUTOMOTIVE VEHICLES

BACKGROUND OF THE INVENTION

The present invention is concerned with a floating-frame spot-type disc brake for high-torque automotive vehicles designed for high performance.

Automotive vehicles designed for high driving speeds require increasingly efficient brakes. High-torque brakes, among other things, require large brake disc diameters. Conversely, the diameters of the vehicle wheels is set by other factors not allowing an increase in wheel diameter. These two requirements severely restrict the assembly space available for the brake between the outer brake disc edge and the wheel rim. Normally, the brake caliper of a disc brake encloses the outer edge of the brake disc, with the radial dimensions of a bridge of the brake caliper located in the aforementioned assembly space limiting the maximum brake disc diameter. The caliper bridge, conversely, is required to have substantial strength as it transmits the tensile forces required for braking.

In a prior-art solution of the type as described in DE-OS 35 08 039, the brake disc has been replaced by an annular disc, the radial inner edge of which is enclosed by the brake caliper (internally enclosing disc brake). The radially outer edge of the annular disc substantially extends to the wheel rim with the maximum possible diameter being attained. However, this high-torque brake is disadvantageous in that the manufacture and assembly of the annular disc on the vehicle wheel involves substantial effort and costs.

EP-412 541 shows a disc brake suitable for a high performance brake, with the brake caliper thereof being in the form of a floating frame which is axially guided on a brake carrier integrally connected to the steering knuckle of the automotive vehicle. The brake carrier extends beyond the outer edge of the brake disc. The floating frame enclosed four brake shoes disposed on either side of the brake disc and transmits the tensile force. The circumferential forces are transferred from the brake shoes to the brake carrier. The brake carrier, on the axial inner side of the wheel, is connected to the automotive vehicle. In order to enable the circumferential forces of the two axial outer brake shoes to also be absorbed, the brake carrier comprises a carrier arm extending across the outer edge of the brake disc and through the center of the chamber enclosed by the floating frame.

High torque brakes require that the brake shoes have large friction surfaces. Increasing the size of the brake shoes, especially in the circumferential direction of the brake disc, has the disadvantage that the friction surface is no longer has a uniform pressure applied, even if two brake cylinders in side-by-side relationship are used instead of one brake cylinder. Consequently, two short-length brake shoes are used, which are separately pressed onto the brake disc by each of two brake pistons in side-by-side relationship.

An additional requirement placed upon a high performance brake is that its weight should be as low as possible. For increasing the weight of high-torque brakes increases the unsprung weight on the vehicle wheels, which, in turn, has a negative effect on the handling of the automotive vehicle. For this reason, the braking efficiency cannot be enhanced by simply increasing the size of the brake.

It is an object of the invention to improve the brake performance of a disc brake of the afore-described typed while maintaining a low weight.

SUMMARY OF THE INVENTION

The present invention is constituted by an arrangement comprising a brake carrier located entirely on the inside of the brake disc and mounting the two inside brake shoes. A floating frame is mounted to the brake carrier, surrounding both brake shoe sets, and the floating frame is constituted in part by spaced arm sections which extend across the brake disc edge, to an outer portion, the outer portion receiving the outside brake shoes.

The invention has the advantage that the maximum diameter of the brake disc is limited only by the thickness of the floating frame. The sections of the floating frame extending across the edge of the brake disc can be thin as, primarily, they have to transmit tensile forces and substantially no bending torques. Another advantage resides in the weight savings due to the eliminated carrier arm.

The opening enclosed by the floating frame defines the width of the friction surface of the brake shoes, as the space accommodating the brake shoes is not restricted by the presence of a carrier arm. The brake shoes can thus be more closely fit to the available space. Consequently, with identical dimensions of the floating frame, a larger friction surface is attained, or, with a constant friction surface, the size and, hence, the weight of the brake is reduced.

The outer end section connecting the arm sections of the floating frame preferably is formed with a reinforcing web.

Another embodiment takes advantage of the fact that with the configuration of the brake carrier according to the invention two smaller brake shoes is not absolutely necessary. The noise generating tendency of the brake may be improved by an arrangement of two inner brake shoes and a single outer brake shoe.

In conventional floating-frame disc-type brakes, the brake shoes, usually, are fixed to retaining pins that extend within the area between the wheel rim and the radially outer edge of the brake disc, in the axial direction. However, the maximum permitted brake disc diameter might thereby be restricted.

Accordingly, in a preferred embodiment of the invention, mounting means are provided on the rear side of the brake shoes and within the interior of the brake. The improved fixation does not restrict the brake disc diameter and enables a particularly simple and safe manual assembly of the brake shoes. For this purpose, a brake shoe is introduced from the exterior through the opening enclosed by the floating frame and carrying a pin radially forced against the edge of a groove on a hollow actuator piston by a retaining spring, whereby the brake is locked on the floating frame.

The retaining spring for use with a disc brake of the invention is formed with clips engaging the brake carrier and a tongue urging an associated brake shoe radially outward.

DETAILED DESCRIPTION

Figure 1:
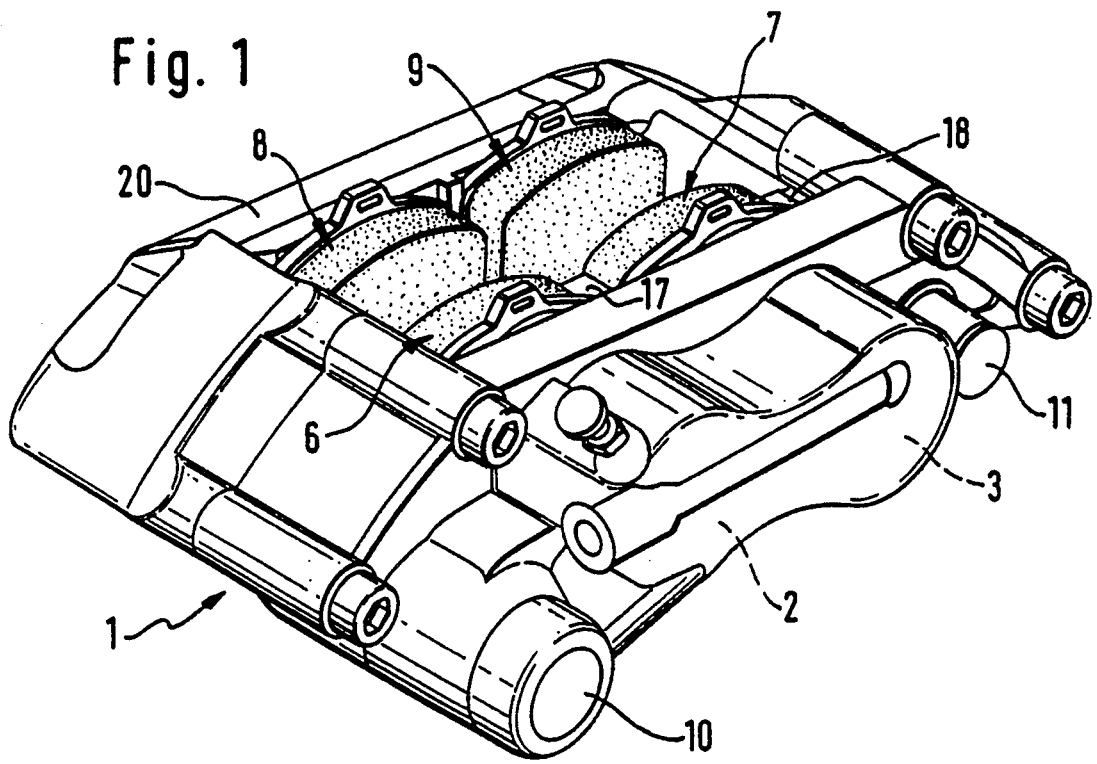
FIG. 1 is a perspective full view of a first embodiment of the floating-frame-type brake according to the invention.

A first embodiment of a floating-frame-type brake according to the invention having four brake shoes is shown in FIGS. 1 to 4. A floating frame 1 is provided which is generally rectangular, and having a pair of arm sections extending across the outer edge of the brake disc 15, and an inner and outer connected sides defining a central opening. The central opening encloses pairs of brake shoes 6, 7, 8, 9 on either side of the brake disc 15. A hydraulic actuator is provided on the inner side of the floating frame 1, comprising two brake cylinders 2, 3 in side-by-side relationship and two brake pistons 4, 5 sliding within the brake cylinders 4, 5. The brake pistons 4, 5, upon actuation of the hydraulic actuator, force the two inside two brake shoes 6, 7 directly against the brake disc 15 (shown in dashed lines) while the two outside brake shoes 8, 9 are anchored on the outer side of the floating frame 1 and, through the same, are indirectly forced against the disc brake 15.

The floating frame 1, through two bolt guides 10, 11 is disposed on a brake carrier 12 in an axially displaceable manner. For rigidly anchoring the brake carrier 12 on the steering knuckle (not shown) of the automotive vehicle, two bores 13, 14 are provided for receiving two mounting screws therethrough.

Figure 2:
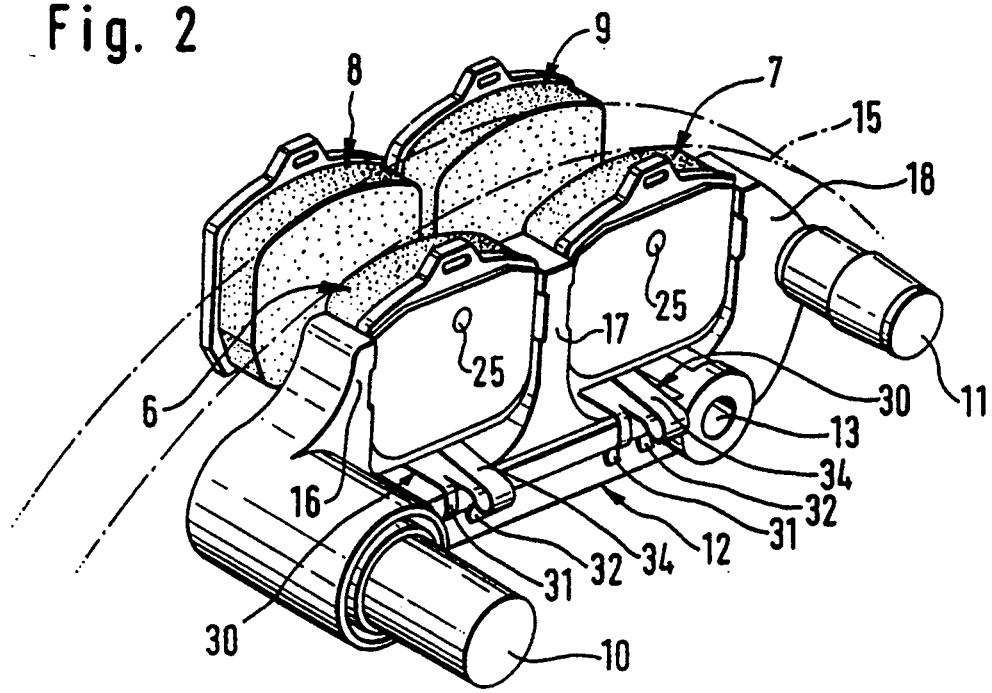
FIG. 2 is a perspective partial view of the brake carrier with brake shoes according to FIG. 1, with the floating frame removed.

As best shown in FIG. 2, the brake carrier 12 is completely disposed on the inner axial side of the brake disc 15, and comprises three radial fingers 16, 17, 18 between which the brake shoes 6, 7 are axially displaceable. Through the fingers 16, 17, 18, the circumferential forces occurring during braking are transmitted from the axially internally disposed brake shoes 6, 7 to the brake carrier 12 directly. By dividing the total friction surface among two small brake shoes 6, 7 and by the independent actuation thereof through two brake pistons 4, 5, a uniform contact pressure and an improved noise generation characteristic are attained.

The two axially outer brake shoes 8, 9 are connected to the outside floating frame 1, thereby enabling the circumferential forces arising during brake operation to be transmitted, through the arm sections of the floating frame 1 and through the bolt guide 10, into the brake carrier 12.

The bolt guide 10 for transmitting the circumferential forces is of a particularly strong design. The other bolt guide 11 is weaker, as it only serves for guiding the floating frame 1. To compensate manufacturing tolerances, the bolt guide 11, moreover, is provided with a self aligning bearing.

In view of this arrangement in which the circumferential forces of the axially outer brake shoes 8, 9, through the floating frame 1, are transferred to the axially internal brake carrier 12, the latter may be of a very compact and light-weight design. No brake carrier arm is provided extending across the outer edge of the brake disc 15.

Figure 4:
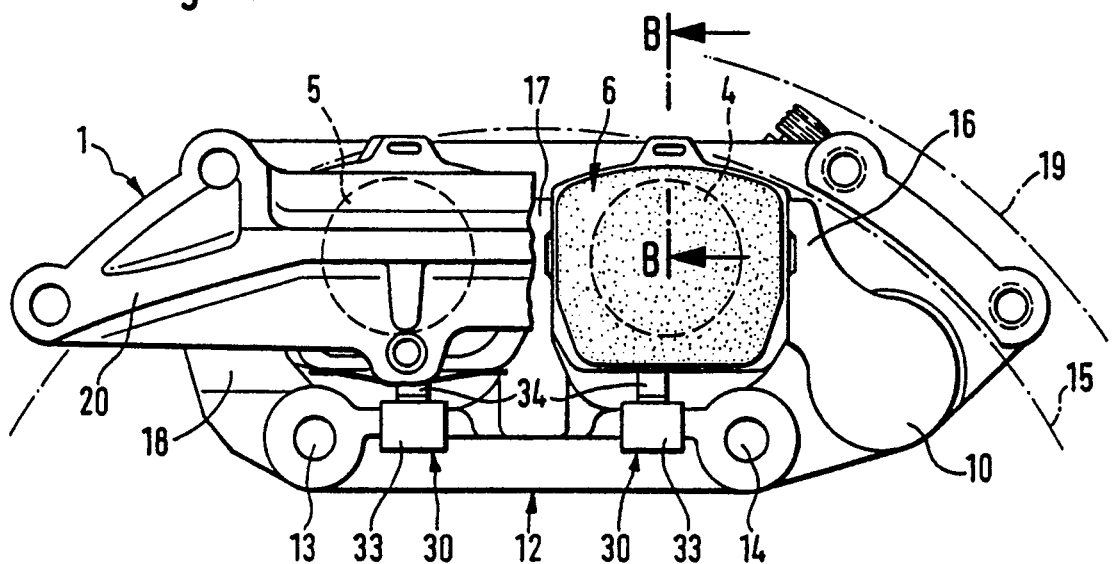
FIG. 4 is a side view, partly in section, of the brake of FIG. 1 viewed from direction A in FIG. 3.

As best shown in FIG. 4, the floating frame 1, has arm sections passing through the area between the outer edge cf the brake disc 15 and the wheel rim shown in broken lines 19 which are of an extremely thin configuration, thereby limiting the maximum brake disc diameter as little as possible.

Figure 3:
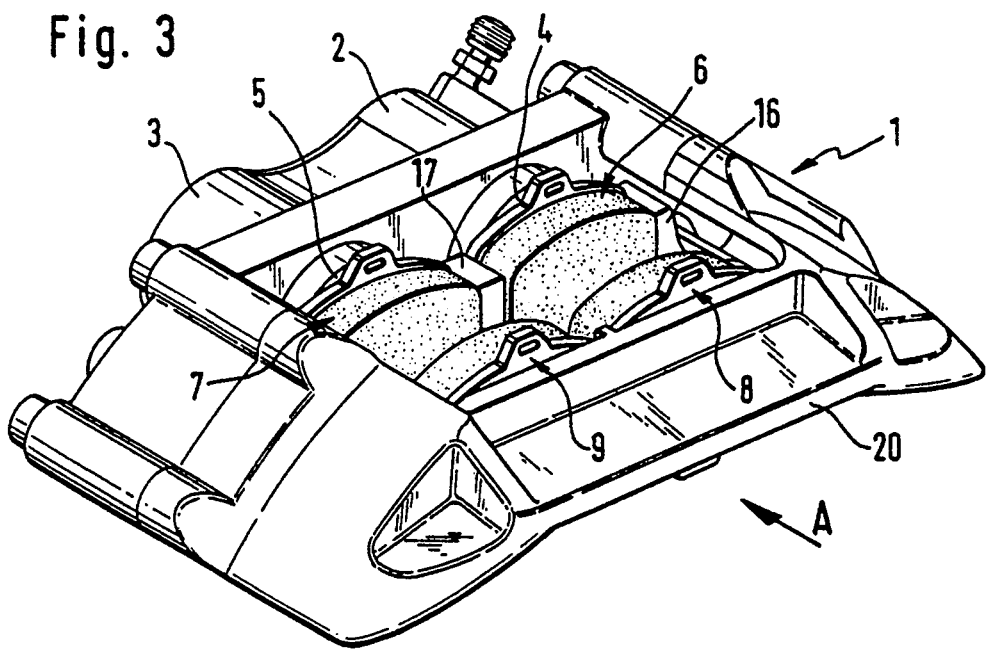
FIG. 3 is a perspective view of the brake according to FIG. 1, shown in the reverse direction.

As best shown in FIG. 3, the floating frame 1, on the axially outer side thereof connecting the arm sections, is reinforced by a web 20 which, on the sides thereof, is angled to substantially follow the brake disc edge.

Figure 5:
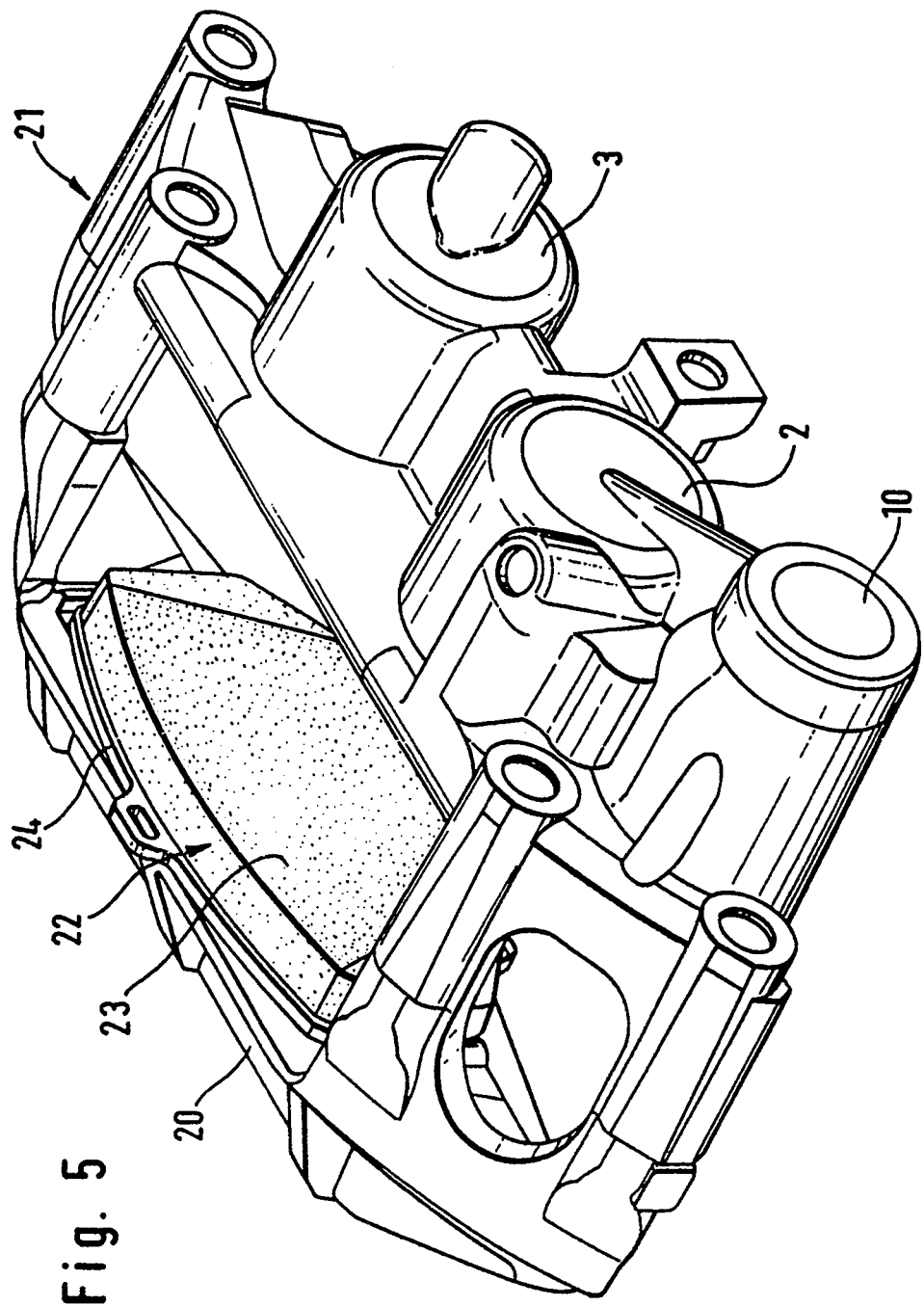
FIG. 5 is a perspective full view of a second embodiment of a floating frame brake.

FIG. 5 shows a second embodiment of a floating caliper 21 according to the invention, in which only a single brake shoe 22 is provided on the axially outer side . The area of the friction surface 23 of the brake shoe 22 substantially equals the aggregate areas of the friction surfaces of the opposite inside brake shoes 6, 7 (not shown in FIG. 5). A division of the friction surface 23 among two smaller brake shoes, on the axial outer side of the floating frame 1, is not so urgently needed as it is on the opposite inner axial side since the brake shoe 22 is connected to the outer side of the floating frame 1 and is thereby in planar abutment with a large internal face defined by the outside section, thereby insuring a uniform contact pressure of the large friction face 23 against the brake disc 15.

Figure 6:
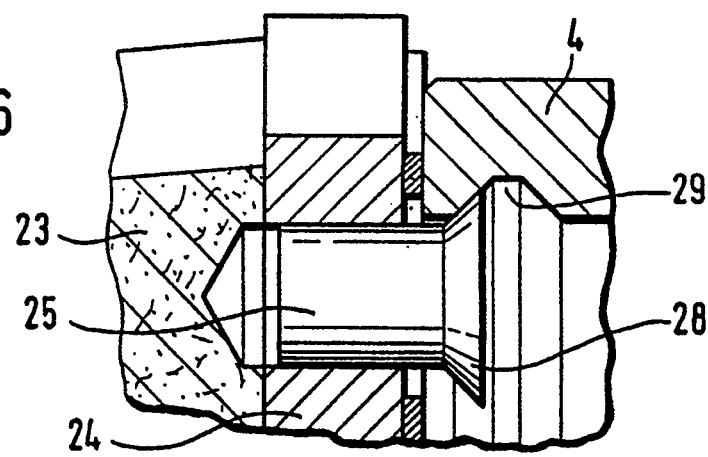
FIG. 6 is a sectional view of a detail of a brake shoe along line B—B of FIG. 4 with a pin forced into a bore.
Figure 7:
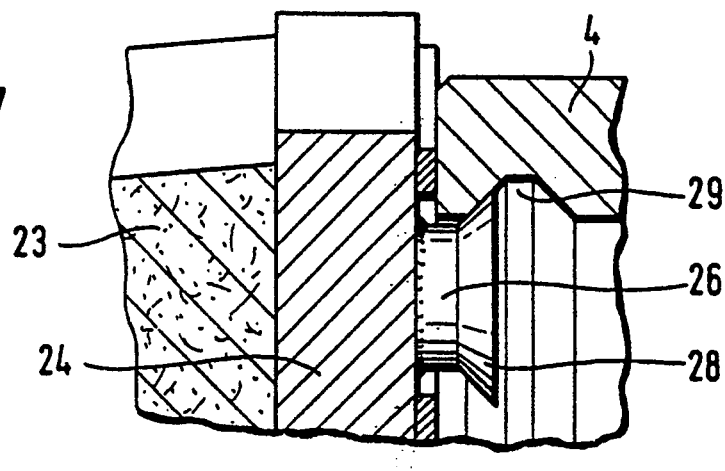
FIG. 7 is a detail of the type as shown in FIG. 6 comprising a pin welded thereto.
Figure 8:
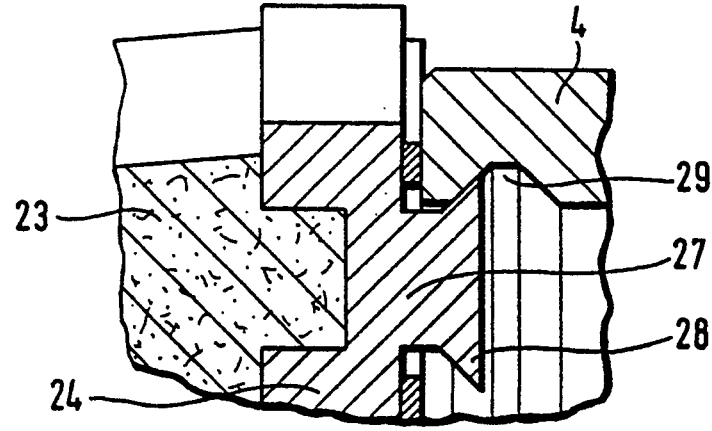
FIG. 8 is a detail of the type as shown in FIG. 6 comprising a punched-through projection of the back plate.

As best shown in FIGS. 6 to 8, each of the brake shoes 23 is furnished with a pin 25 secured to the back plate 24 thereof, with the free end 28 of pin 25 being conically broadened. The pin 25 is forced into a bore within the back plate 24.

Alternatively, as shown in FIG. 7, a modified pin 26 also can be welded, as by friction welding, to the back plate 24.

In one embodiment shown in FIG. 8, the separate pin and the mounting thereof can be foregone. In that instance, the back plate 24 is provided with a punched-through projection 27 the protruding end 28 of which is conically shaped.

The brake pistons 4, 5 are hollow and, on the inner side thereof, are provided with a circumferential annular groove 29. The pin 25 of a brake shoe 6, 7 in abutment with the brake piston 4, 5, with the conical end 28 thereof engages the annular groove 29.

The brake shoes 6, 7 by means of two retaining springs 30 (FIGS. 2, 4) attached to the brake carrier 12 are forced radially outwardly (upwardly in the drawings), so that the pins 25 securely engage the annular grooves 29, thereby radially fixing the brake shoes 6, 7 and axially forcing them against the brake pistons 4, 5.

The angled retaining springs 30 integrally punched from a sheet of spring metal respectively comprise three anchor clips 31, 32, 33 and one spring tongue 34. The anchor clips 31, 32, 33 enclose the two axial sides of a web of the brake carrier 12 to be locked therein (FIGS. 2, 4). The spring tongue 34 is in abutment with the radially inward narrow side of the back plate 24 of the brake shoe 6, 7. As the spring tongue 34 is slightly bent vis-a-vis the axial direction, it will force the brake shoe 6, 7 not only radially outwardly (upwardly) but also axially against the brake piston 4, 5.

The back plate 24 of each of the brake shoes 6, 7, 8, 9, 22, at the radially outer narrow sides thereof, are provided with an ear. The ears are not intended for the passage of pins therethrough but for insuring an easy removal of the brake shoes.

We claim:

1. A spot-type disc brake for an automotive vehicles having a brake disc, and a steering knuckle comprising:
a brake carrier fixed to said steering knuckle of said automotive vehicle on an inner side of said brake disc, a floating frame comprised of a pair of spaced arm sections and inner and outer sides connecting said arm sections at respective ends thereof, together defining an opening, said arm sections extending across an outer edge of said brake disc, said frame guided on said brake carrier in an axillary displaceable manner, said floating frame having two brake cylinders mounted to the inner side thereof and two brake pistons respectively disposed therein , two inner brake shoes on said inner side of said brake disc and at least one outer brake shoe on the outer side of said brake disc, all of said brake shoes enclosed within said opening of said floating frame, means mounting said two inner brake shoes on said brake carrier to transmit circumferential braking reaction forces thereinto, means mounting said at least one outer brake shoe to said outer side of said floating frame to transmit circumferential reaction forces exerted thereon to said brake carrier, said brake carrier is disposed completely on the said inner side of said brake disc.

2. A spot-type disc brake according to claim 1, wherein said two axillary inner brake shoes in the circumferential direction of said brake disc, are in close adjacent relationship, said inner brake shoe mounting means including a narrow finger fixed to said brake carrier, said two inner brake shoes separated only by said narrow finger of said brake carrier (12) extending between said two inner brake shoes in a radial direction to absorb said circumferential forces.

3. A spot-type disc brake according to claim 2 further including an additional surface facing each side of said narrow finger, with a respective inner brake shoe fit between an additional surface and a side of said narrow finger.

4. A spot-type disc brake according to claim 1, wherein said outer side of said floating frame is formed with an axillary projecting reinforcing web which is angled to approximately conform with said brake disc edge.

5. A spot-type disc brake according to claim 1, wherein said at least one outer brake shoe comprises a single outer brake shoe disposed on the axillary outer side of the brake disc closely held on said floating frame outer side, said single outer brake shoe having a friction face having an area which is substantially equal to the combine area of friction faces of said inner two brake shoes.

6. A spot-type disc brake according to claim 1, wherein at least one of said inner brake shoes, has a back plate, having at least one projection protruding from said back plate, said projection having a broadened end, and wherein at least one brake piston associated with said back plate is hollow and formed with a recess provided in the interior thereof, said at least one brake shoe radially prestressed by at least one retaining spring fixed to one of said floating frame or said brake carrier, said end of said projection radially forced thereby into said recess to be locked therein.

7. A spot-type disc brake according to claim 6, wherein said projection end is conically shaped;

8. A spot-type disc brake according to claim 6 wherein said projection comprises a pin welded to said back plate.

9. A spot-type disc brake according to claim 6, wherein said projection comprises a pin force fit into a bore of said back plate.

10. A spot-type disc brake according to claim 6, wherein said retaining spring is fixed to said brake carrier, and comprises at least two anchoring clips anchoring said retaining spring and gripping a portion of said brake carrier, said retaining spring having a spring tongue extending at a small angle to the axial direction and being in radially resilient abutment with a radially inner narrow side of said back plate of said at least one brake shoe.

11. A spot-type disc brake according to claim 1, wherein two outer brake shoes are provided tightly fit into pairs of circumferentially spaced surfaces formed on said floating frame adjacent said outer side thereof.

* * * * *